United States Patent
Poirier et al.

(10) Patent No.: US 11,812,060 B2
(45) Date of Patent: Nov. 7, 2023

(54) METHOD AND DEVICE FOR DEBLOCKING FILTERING A BOUNDARY WITHIN AN INTRA PREDICTED BLOCK

(71) Applicant: INTERDIGITAL VC HOLDINGS, INC., Wilmington, DE (US)

(72) Inventors: Tangi Poirier, Thorigné-Fouillard (FR);
Fabrice Leleannec, Mouazé (FR);
Fabrice Urban, Thorigne Fouillard (FR)

(73) Assignee: INTERDIGITAL VC HOLDINGS, INC., Wilimington, DE (US)

( * ) Notice: Subject to any disclaimer, the term of this patent is extended or adjusted under 35 U.S.C. 154(b) by 236 days.

(21) Appl. No.: 16/301,321

(22) PCT Filed: Apr. 24, 2017

(86) PCT No.: PCT/EP2017/059672
§ 371 (c)(1),
(2) Date: Nov. 13, 2018

(87) PCT Pub. No.: WO2017/194297
PCT Pub. Date: Nov. 16, 2017

(65) Prior Publication Data
US 2019/0200045 A1 Jun. 27, 2019

(30) Foreign Application Priority Data
May 13, 2016 (EP) .................................... 16305564

(51) Int. Cl.
*H04N 19/86* (2014.01)
*H04N 5/232* (2006.01)
(Continued)

(52) U.S. Cl.
CPC ............. *H04N 19/63* (2014.11); *G06T 7/254* (2017.01); *G06V 20/40* (2022.01); *H04N 19/176* (2014.11);
(Continued)

(58) Field of Classification Search
CPC .............................. H04N 19/86; H04N 19/865
See application file for complete search history.

(56) References Cited

U.S. PATENT DOCUMENTS

| | | | |
|---|---|---|---|
| 2005/0105811 | A1 | 5/2005 | Van Eggelen |
| 2008/0123750 | A1 | 5/2008 | Bronstein et al. |

(Continued)

FOREIGN PATENT DOCUMENTS

| | | |
|---|---|---|
| CN | 101321277 A | 12/2008 |
| CN | 102948146 A | 2/2013 |

(Continued)

OTHER PUBLICATIONS

Anonymous, "Block Partitioning Structure for Next Generation Video Coding", International Telecommunication Union, Telecommunication Standardization Sector, Document COM 16-C 966 R3-E, Sep. 2015, pp. 1-8.

(Continued)

*Primary Examiner* — Jeremiah C Hallenbeck-Huber
(74) *Attorney, Agent, or Firm* — Klintworth & Rozenblat IP LLP

(57) ABSTRACT

A decoding method is disclosed that comprises: —decoding (S120) a block of a picture, said block being intra predicted from a plurality of reference blocks; —determining (S130) a frontier inside the decoded block based on a frontier existing between said plurality of reference blocks; and —filtering (S140) with a de-artifacting filter along the frontier determined inside the decoded block.

20 Claims, 12 Drawing Sheets

(51) Int. Cl.

| | |
|---|---|
| *G06K 9/38* | (2006.01) |
| *G06K 9/00* | (2022.01) |
| *H04N 19/63* | (2014.01) |
| *H04N 19/593* | (2014.01) |
| *H04N 19/82* | (2014.01) |
| *G06T 7/254* | (2017.01) |
| *G06V 20/40* | (2022.01) |
| *H04N 23/61* | (2023.01) |
| *H04N 19/176* | (2014.01) |

(52) U.S. Cl.
CPC ........... *H04N 19/593* (2014.11); *H04N 19/82* (2014.11); *H04N 19/86* (2014.11); *H04N 19/865* (2014.11); *H04N 23/61* (2023.01)

(56) References Cited

U.S. PATENT DOCUMENTS

| | | | |
|---|---|---|---|
| 2013/0034165 A1 | 2/2013 | Sasai et al. | |
| 2013/0101027 A1 | 4/2013 | Narroschke et al. | |
| 2014/0003498 A1* | 1/2014 | Sullivan | H04N 19/186 375/240.03 |
| 2014/0192904 A1* | 7/2014 | Rosewarne | H04N 19/60 375/240.29 |
| 2015/0063452 A1 | 3/2015 | Kim et al. | |
| 2015/0146779 A1 | 5/2015 | Bang et al. | |
| 2015/0350648 A1 | 12/2015 | Fu et al. | |
| 2016/0119631 A1* | 4/2016 | Kawamura | H04N 19/59 375/240.12 |
| 2016/0309148 A1 | 10/2016 | Sasai et al. | |
| 2017/0366807 A1* | 12/2017 | Thoreau | H04N 11/02 |

FOREIGN PATENT DOCUMENTS

| | | |
|---|---|---|
| JP | 2015128311 A | 7/2015 |
| KR | 1020150027530 | 3/2015 |
| KR | 1020150035810 | 4/2015 |
| WO | 2011129100 A1 | 10/2011 |
| WO | 2012077719 A1 | 6/2012 |

OTHER PUBLICATIONS

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Oct. 2014, pp. 1-540.

An et al., "Quadtree plus binary tree structure integration with JEM tools", Joint Video Exploration Team of ITU-T SG 16 WP 3 and ISO/IEC JTC 1/SC 29/WG 11, Document JVET-B0023, San Diego, California, USA, Feb. 20, 2016, pp. 1-6.

Chen et al., "Algorithm Description of Joint Exploration Test Model 2", Joint Video Exploration Team of ITU-T SG 16 WP 3 and ISO/IEC JTC 1/SC 29/WG 11, Document JVET-B1001 v3, San Diego, California, USA, Feb. 20, 2016, pp. 1-32.

Anonymous, "Advanced video coding for generic audiovisual services", International Telecommunication Union, ITU-T Telecommunication Standardization Sector of ITU, Series H: Audiovisual and Multimedia Systems, Infrastructure of audiovisual services—Coding of moving video, Recommendation ITU-T H.264, Mar. 2009, pp. 1-670.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2015, pp. 1-634.

Rosewarne et al., "High Efficiency Video Coding (HEVC) Test Model 16 (HM16) Improved Encoder Description Update 4", International Organisation for Standardisation, ISO/IEC JTC1/SC29/WG11, Coding of Moving Pictures and Audio, Document ISO/IEC JTC1/SC29/WG11 N15777, Geneva, Switzerland, Oct. 2015, pp. 1-63.

Shen, Y.F., et al., "High Efficiency Video Coding" Chinese Journal of Computers, vol. 36 No. 11 Nov. 2013 (16 pages).

* cited by examiner

METHOD AND DEVICE FOR DEBLOCKING FILTERING A BOUNDARY WITHIN AN INTRA PREDICTED BLOCK

This application claims the benefit, under 35 U.S.C. § 365 of International Application PCT/EP2017/059672, filed Apr. 24, 2017, which was published in accordance with PCT Article 21(2) on Nov. 16, 2017, in English, and which claims the benefit of European patent application 16305564.3, filed May 13, 2016.

1. TECHNICAL FIELD

In the following, a method and a device for encoding an intra predicted block of a picture are disclosed. Corresponding decoding method and decoding device are further disclosed.

2. BACKGROUND ART

State of the art methods for coding a current block of a current picture usually comprises predicting the block to obtain a predictor, determining a residual block by subtracting the predictor from the current block and encoding the residual block into a stream. The current block is predicted from one or a plurality of other block(s), called reference blocks, already coded and reconstructed. The one or the plurality of other block(s) belong(s) to the current picture (intra coding) or to another picture different from the current picture (inter coding). In the case where the current block is predicted from a plurality of reference blocks, the predictor may suffer from blocking artifacts. FIG. 1 depicts such a current block B intra predicted from a plurality of reference blocks, namely the spatially neighboring grey blocks.

State of the art methods for coding a current block of a current picture usually comprises in-loop filtering step(s). As an example, in H.265 video coding standard a filtering step using a deblocking filter is included in the coding loop. Other filtering steps may be included such as a sample adaptive offset (SAO) filtering. The H.265 deblocking filter attenuates discontinuities at prediction and transform block boundaries, i.e. the external frontiers of the blocks. However, some discontinuities remains in the picture. There is thus a need to further improve the in-loop filtering in order to increase the coding efficiency of the coding method.

3. BRIEF SUMMARY

A decoding method is disclosed that comprises:
  decoding a block of a picture, the block being intra predicted from a plurality of reference blocks;
  determining a frontier inside the decoded block based on a frontier existing between the plurality of reference blocks; and
  filtering with a deblocking filter along the frontier determined inside the decoded block.

A decoding device is disclosed that comprises:
  means for decoding a block of a picture, the block being intra predicted from a plurality of reference blocks;
  means for determining a frontier inside the decoded block based on a frontier existing between the plurality of reference blocks; and
  means for filtering with a deblocking filter along the frontier determined inside the decoded block.

A decoding device is disclosed that comprises a communication interface configured to access at least a stream and at least one processor configured to:
  decode a block of a picture from the accessed stream, the block being intra predicted from a plurality of reference blocks;
  determine a frontier inside the decoded block based on a frontier existing between the plurality of reference blocks; and
  filter with a deblocking filter along the frontier determined inside the decoded block.

A non-transitory computer readable medium with instructions stored therein is disclosed which, upon execution, instruct at least one processor to:
  decode a block of a picture from the accessed stream, the block being intra predicted from a plurality of reference blocks;
  determine a frontier inside the decoded block based on a frontier existing between the plurality of reference blocks; and
  filter with a deblocking filter along the frontier determined inside the decoded block.

According to a specific characteristic, the block being intra predicted is a block on which the same transform is applied, e.g. a transform block. Each of the reference blocks is a block on which the same transform is applied, e.g. a transform block.

According to a specific embodiment, the intra predicted block being a chroma block predicted from a plurality of co-located luma blocks, determining a frontier inside the decoded block comprises projecting the external frontiers of the plurality of co-located luma blocks into the decoded block.

According to a specific embodiment, the intra predicted block being a block predicted from a plurality of spatially neighboring blocks, determining a frontier inside the decoded block comprises propagating, into the decoded block, a frontier existing between the plurality of spatially neighboring blocks.

According to a specific embodiment, the deblocking filter filters the frontier inside the decoded block based on a quantization parameter associated with the plurality of co-located luma blocks.

According to a specific embodiment, the deblocking filter filters the frontier inside the decoded block based on a quantization parameter associated with the block to be decoded.

According to a specific embodiment, the deblocking filter filters the frontier inside the decoded block based on a strength parameter equal to a strength parameter used in deblocking external frontiers of the decoded block.

A coding method is disclosed that comprises:
  coding and reconstructing a block of a picture, the block being intra predicted from a plurality of reference blocks;
  determining a frontier inside the reconstructed block based on a frontier existing between the plurality of reference blocks; and
  filtering with a deblocking filter along the frontier determined inside the reconstructed block.

A coding device is also disclosed that comprises:
  means for coding and reconstructing a block of a picture, the block being intra predicted from a plurality of reference blocks;
  means for determining a frontier inside the reconstructed block based on a frontier existing between the plurality of reference blocks; and
  means for filtering with a deblocking filter along the frontier determined inside the reconstructed block.

A coding device is disclosed that comprises a communication interface configured to access at least a block of a picture and at least one processor configured to:

code and reconstruct the accessed block, the block being intra predicted from a plurality of reference blocks;

determine a frontier inside the reconstructed block based on a frontier existing between the plurality of reference blocks; and filter with a deblocking filter along the frontier determined inside the reconstructed block.

A non-transitory computer readable medium with instructions stored therein is disclosed which, upon execution, instruct at least one processor to:

code and reconstruct the accessed block, the block being intra predicted from a plurality of reference blocks;

determine a frontier inside the reconstructed block based on a frontier existing between the plurality of reference blocks; and filter with a deblocking filter along the frontier determined inside the reconstructed block.

According to a specific characteristic, the block being intra predicted is a block on which the same transform is applied, e.g. a transform block. Each of the reference blocks is a block on which the same transform is applied, e.g. a transform block.

According to a specific embodiment, the intra predicted block being a chroma block predicted from a plurality of co-located luma blocks, determining a frontier inside the reconstructed block comprises projecting the external frontiers of the plurality of co-located luma blocks into the reconstructed block.

According to a specific embodiment, the intra predicted block being a block predicted from a plurality of spatially neighboring blocks, determining a frontier inside the reconstructed block comprises propagating, into the reconstructed block, a frontier existing between the plurality of spatially neighboring blocks.

According to a specific embodiment, the deblocking filter filters the frontier inside the reconstructed block based on a quantization parameter associated with the plurality of co-located luma blocks.

According to a specific embodiment, the deblocking filter filters the frontier inside the reconstructed block based on a quantization parameter associated with the block to be coded.

According to a specific embodiment, the deblocking filter filters the frontier inside the reconstructed block based on a strength parameter equal to a strength parameter used in deblocking external frontiers of the reconstructed block.

4. BRIEF SUMMARY OF THE DRAWINGS

5. DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

According to the present principles, a block is a square or rectangular part of a picture comprising samples associated with sample values, e.g. luma samples or chroma samples. For convenience of terminology, the terms are referred to as luma and chroma. However, the methods and devices disclosed may apply to different colour representation such as for example RGB. Therefore, in all embodiments luma may be replaced by a first component and chroma by a second component.

In the following, the word "reconstructed" and "decoded" can be used interchangeably. Usually but not necessarily "reconstructed" is used on the encoder side while "decoded" is used on the decoder side.

Figure 2:
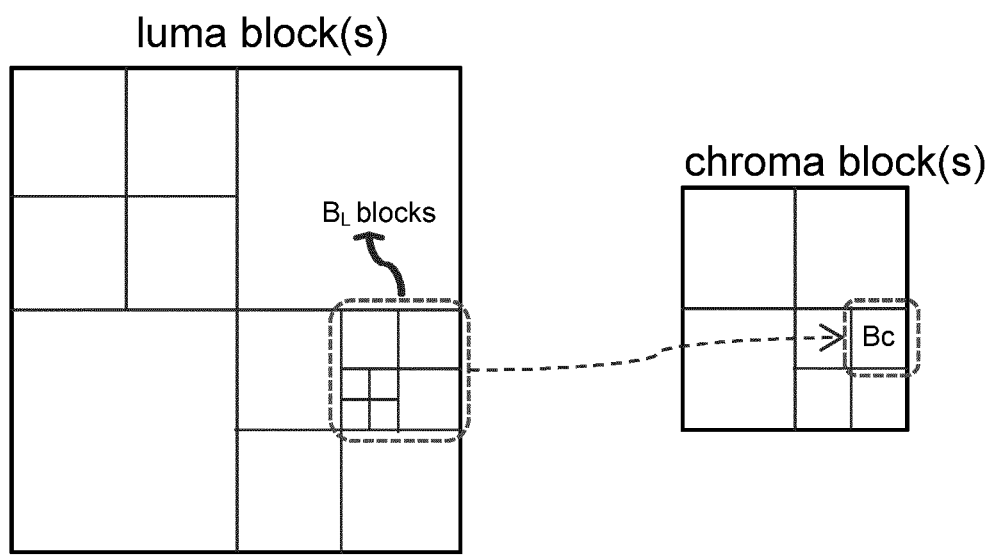
FIG. 2 represents on the left a luma component of a portion of a picture divided into blocks according to a quad-tree decomposition and on the right a chroma component of the same portion of the picture divided into blocks according to a quad-tree decomposition.

FIG. 2 represents, on the left, a luma component of a picture divided into blocks according to a first quad-tree decomposition. The FIG. 2 represents, on the right, a chroma component of the picture divided into blocks according to a second quad-tree decomposition different from the first quad-tree decomposition.

The blocks may be Transform Blocks (TB) or Prediction blocks (PB) within the meaning of H.265. A TB is a rectangular block of samples of a color component on which the same transform is applied for coding a residual signal. In the following, TB is used to designate such a block on which the same transform is applied. A PB is a rectangular block of samples of a color component on which one and the same prediction is applied (e.g. same motion parameters for motion compensated prediction). In HEVC, a Coding Tree Block (CTB) is subdivided recursively into Coding Blocks (CBs) along a coding tree structure. A CB may then be partitioned into multiple TBs. The partitioning of a CB into TBs is carried out recursively based on a quad-tree approach. In the case where a CB is not further partitioned, the CB is considered to be a TB. To each type of block (i.e. TB, PB, CB, CTB) corresponds a unit (i.e. a transform unit TU, a prediction unit PU, a coding unit CU and a coding tree unit CTU respectively). A unit comprises information related to all color components, e.g. the luma component and the two chroma components. As an example, a CTU comprises a CTB of luma samples and two corresponding CTB of chroma samples in the case of a color picture. In the same way, a CU comprises a CB of luma samples and two corresponding CB of chroma samples in the case of a color picture.

In other implementations different from H.265, the blocks may be Coding Blocks (CB) and/or Prediction Blocks (PB), in the case where a CB and/or a PB is/are defined as rectangular block(s) of samples on which the same transform is applied for coding the residual signal.

On FIG. 2, a plurality of luma blocks $B_L$ surrounded by a dashed line are co-located to the single chroma block $B_C$ also surrounded by a dashed line. Co-located means that the block $B_C$ and the blocks $B_L$ cover the same portion of the picture possibly subject to downsampling depending on the color format (4:4:4, 4:2:0, . . . ). The chroma block $B_C$ is for example a CB and each luma block $B_L$ is for example a TB, the plurality of blocks $B_L$ forming a luma CB co-located with the chroma CB. On FIG. 2, the chroma component is downsampled with respect to the luma component. It will be appreciated, however, that the present principles also apply to the case where the luma component and the chroma component(s) have the same resolution. By using different quad-tree decompositions for dividing the chroma component and the luma component, blocking artifacts may appear in the case where the chroma block $B_C$ is intra predicted from the luma component, more precisely from the co-located blocks $B_L$ of the luma component. When blocking artifacts are created in a predictor, these artifacts usually appear in the residual block derived from the predictor and thus also in the reconstructed/decoded block.

Figure 3:
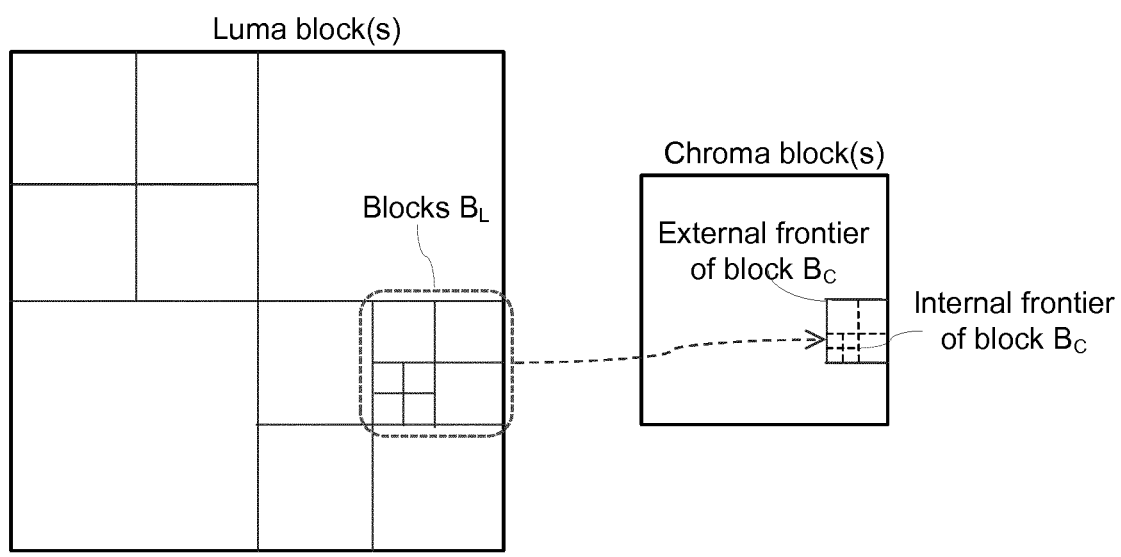
FIG. 3 shows exemplary frontiers, i.e. dividing lines, that may be created inside the reconstructed chroma block $B_C$ because of its intra prediction from a plurality luma blocks $B_L$.

FIG. 3 shows frontiers, i.e. dividing lines, that may be created inside the reconstructed chroma block $B_C$ because of its intra prediction from the plurality of luma blocks $B_L$. This intra prediction mode is also named LM mode in the literature (LM stands for "Linear Mode"). This mode exploits inter-component correlation using reconstructed luma samples rec$\gamma$ to predict chroma samples linearly with parameters $\alpha$ and $\beta$. The parameters $\alpha$ and $\beta$ may be derived from spatially neighboring reconstructed luma and chroma samples at both encoder and decoder to avoid overhead signaling. In a variant, the parameters $\alpha$ and $\beta$ may be derived from the source luma and chroma samples at an encoder, coded and transmitted to a decoder.

Figure 4:
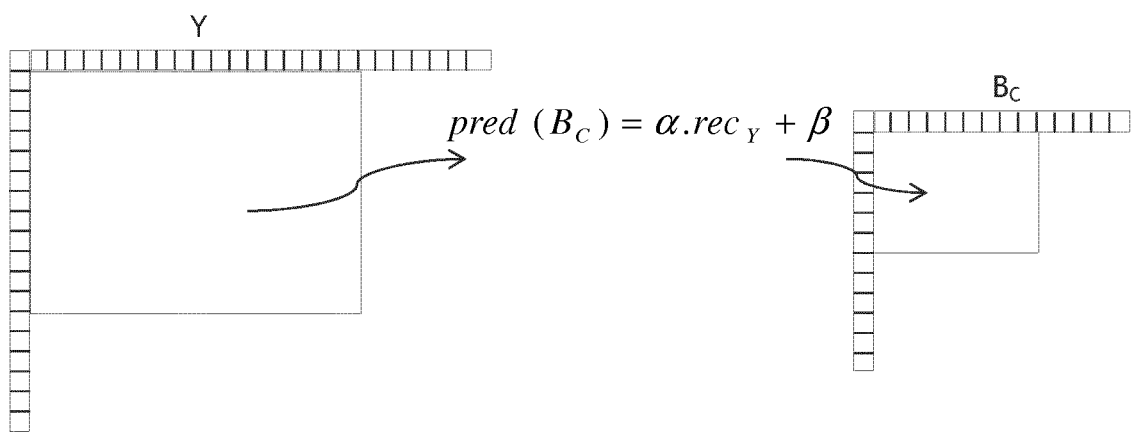
FIG. 4 illustrates the prediction of a chroma block from reconstructed luma samples.

FIG. 4 illustrates the LM mode. The chroma block $B_C$ is predicted from reconstructed luma samples rec$\gamma$ of the blocks $B_L$.

The H.265 deblocking filter only filters the external frontier of the chroma block $B_C$ and thus does not reduce the blocking artifacts inside the chroma block $B_C$ in the case of prediction from co-located reconstructed luma samples. Indeed, the H.265 standard specifies the deblocking filter as a process that applies on the transform block or prediction block external frontiers after the picture is reconstructed/decoded.

Figure 5:
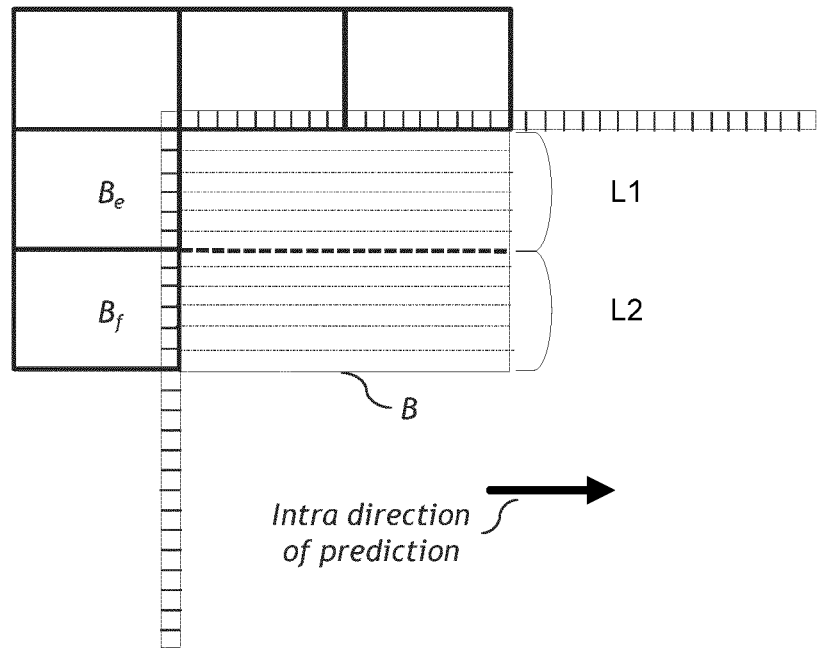
FIG. 5 depicts a block B to be intra predicted from spatially neighboring blocks Be and Bf according to a horizontal direction.

FIG. 5 depicts a block B (e.g. a luma TB or a chroma TB) intra predicted from spatially neighboring blocks Be and Bf according to a horizontal direction of prediction.

State of the art video coding standards (e.g. H.264, H.265) define a spatial intra prediction mode. According to this mode, the block B is thus predicted from spatially neighboring blocks already reconstructed/decoded. The prediction is made according to a direction of prediction. In H.264 video coding standard 9 directions of prediction are defined while in H.265 33 directions of prediction are defined. In the example as shown in FIG. 5, the first lines (L1) of the predictor are derived from the block Be. The last lines (L2) of the predictor are derived from the block Bf. Consequently, a frontier may appear in the predictor. The frontier is represented by the dashed line on FIG. 5. In the case where, a frontier is present inside the predictor, this frontier appears also in the residual block and thus in the reconstructed/decoded block.

Figure 6:
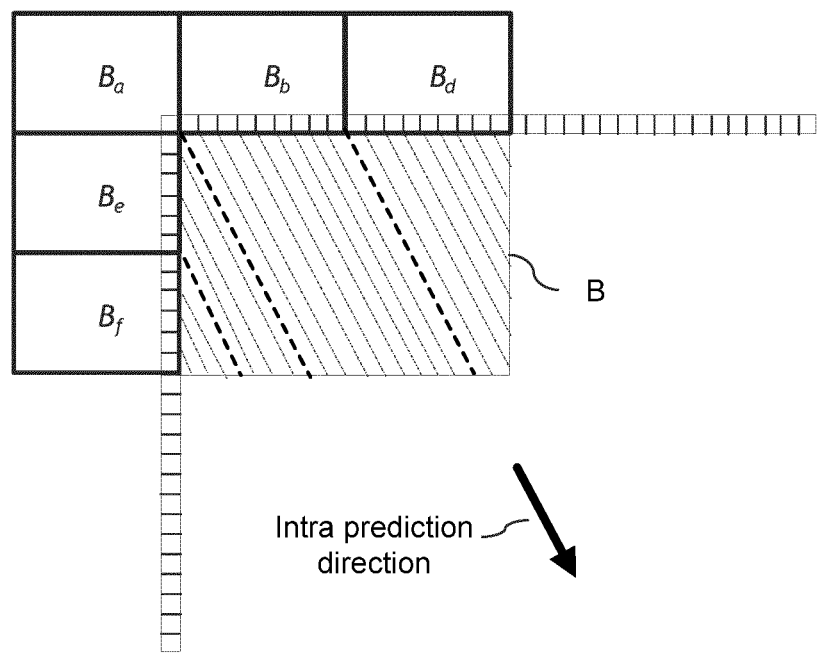
FIG. 6 depicts a block B to be intra predicted from spatially neighboring blocks Ba, Bb, Bd, Be, Bf according to an angular direction.

FIG. 6 depicts a block B (e.g. a TB) that is intra predicted from spatially neighboring blocks Ba, Bb, Bd, Be, Bf according to an angular direction. A frontier that follows the angular direction of prediction may appear in the predictor. The frontiers are represented by dashed lines on FIG. 6.

Figure 16:
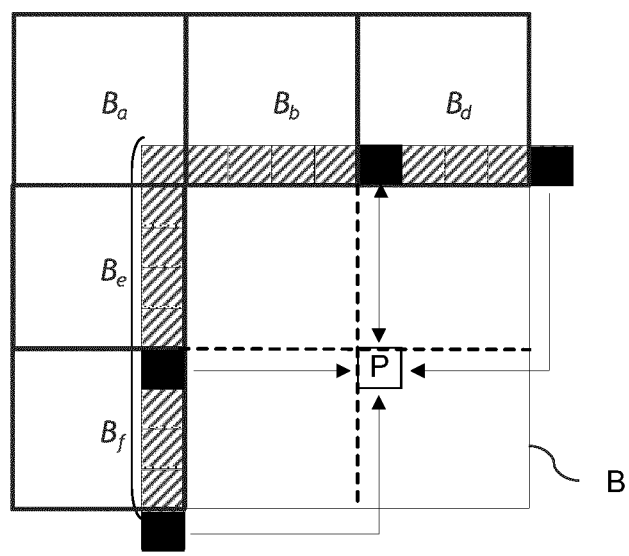
FIG. 16 depicts a block B to be intra predicted from spatially neighboring blocks Ba, Bb, Bd, Be, Bf according to a planar mode.

FIG. 16 depicts a block B (e.g. a TB) that is intra predicted from spatially neighboring blocks Ba, Bb, Bd, Be, Bf (spatially neighboring TBs) according to a planar prediction mode. The pixel P is predicted according to the planar mode by a linear combination of the 4 pixels (indicated by the 4 black squares) of the spatially neighboring blocks. A horizontal frontier and a vertical frontier may appear in the predictor. The frontiers are represented by dashed lines on FIG. 16.

The H.265 deblocking filter only filters the external frontier of the block B and thus would not reduce the blocking artifact inside the block B in the case of spatial prediction from a plurality neighboring blocks. Indeed, the H.265 deblocking filter only filters the transform block or prediction block external frontiers after the picture is reconstructed/decoded.

Figure 7:
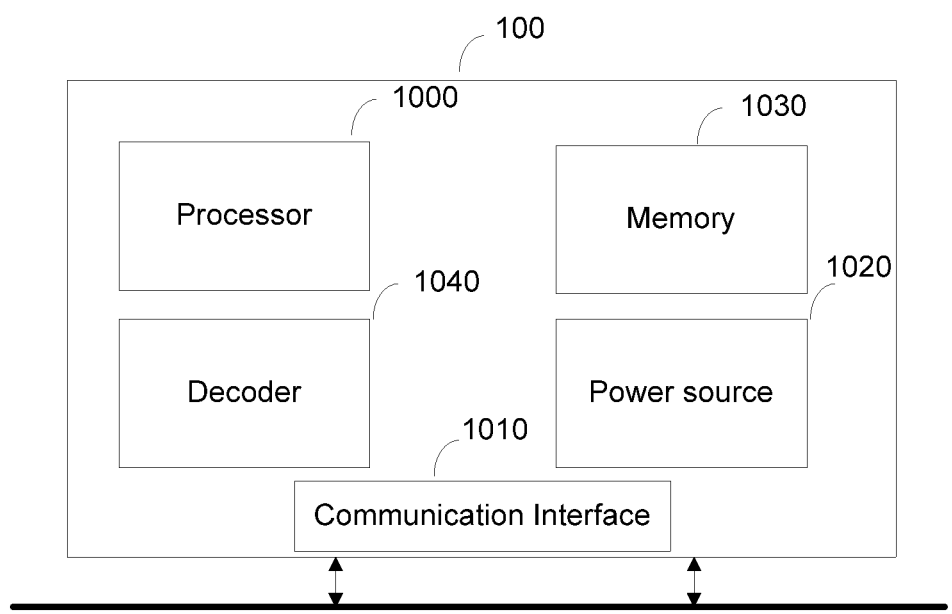
FIG. 7 represents an exemplary architecture of a receiver configured to decode a block of a picture from a stream to obtain a decoded block according to a non-limiting embodiment, wherein the block is intra predicted.

FIG. 7 represents an exemplary architecture of a receiver 100 configured to decode a block of a picture from a stream to obtain a decoded block according to a non-limiting embodiment, wherein the block is intra predicted.

The receiver 100 comprises one or more processor(s) 1000, which could comprise, for example, a CPU, a GPU and/or a DSP (English acronym of Digital Signal Processor), along with internal memory 1030 (e.g. RAM, ROM and/or EPROM). The receiver 100 comprises one or more communication interface(s) 1010 (e.g. a keyboard, a mouse, a touchpad, a webcam), each adapted to display output information and/or allow a user to enter commands and/or data; and a power source 1020 which may be external to the receiver 100. The receiver 100 may also comprise one or more network interface(s) (not shown). The decoder module 1040 represents the module that may be included in a device to perform the decoding functions. Additionally, the decoder module 1040 may be implemented as a separate element of the receiver 100 or may be incorporated within processor(s) 1000 as a combination of hardware and software as known to those skilled in the art.

The stream may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the decoded block may be sent to a destination, e.g. a display device. As an example, the decoded block is stored in a remote or in a local memory, e.g. a video memory or a RAM, a hard disk. In a variant, the decoded block is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 100 further comprises a computer program stored in the memory 1030. The computer program comprises instructions which, when executed by the receiver 100, in particular by the processor 1000, enable the receiver to execute the decoding method described with reference to any one of the FIGS. 8, 9 and 10. According to a variant, the computer program is stored externally to the receiver 100 on a non-transitory digital data support, e.g. on an external storage medium such as a HDD, CD-ROM, DVD, a read-only and/or DVD drive and/or a DVD Read/Write drive, all known in the art. The receiver 100 thus comprises a mechanism to read the computer program. Further, the receiver 100 could access one or more Universal Serial Bus (USB)-type storage devices (e.g., "memory sticks.") through corresponding USB ports (not shown).

According to exemplary and non-limiting embodiments, the receiver 100 can be, but is not limited to:
- a mobile device;
- a communication device;
- a game device;
- a set top box;
- a TV set;
- a tablet (or tablet computer);
- a laptop;
- a video player, e.g. a Blu-ray player, a DVD player;
- a display and
- a decoding chip or decoding device.

On the following FIGS. 8, 9, 10, 12, 13 and 14, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively <<Application Specific Integrated Circuit>>, <<Field-Programmable Gate Array>>, <<Very Large Scale Integration>>, or from several integrated electronic components embedded in a device or from a blend of hardware and software components.

Figure 8:
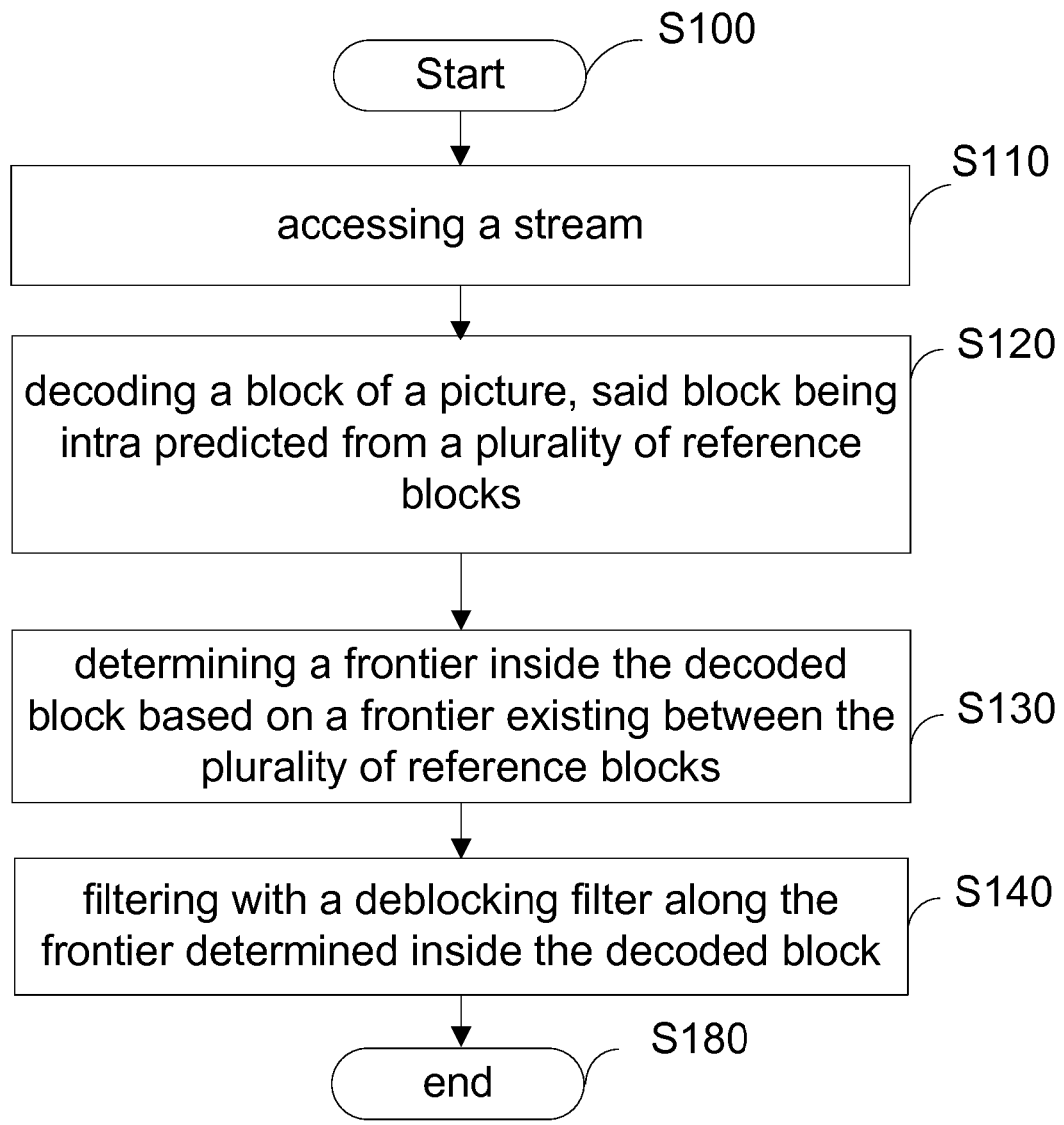
FIG. 8 represents a flowchart of a method for decoding a block of a picture from a stream to obtain a decoded block according to a specific and non-limiting embodiment, wherein the block is intra predicted.

FIG. 8 represents a flowchart of a method for decoding a block of a picture from a stream to obtain a decoded block according to a specific and non-limiting embodiment, wherein the block is intra predicted from a plurality of reference blocks.

The method starts at step S100. At step S110, a receiver accesses a stream. At step S120, the receiver decodes a block from the stream. Decoding the block comprises decoding a residual block from the stream, transforming the residual block using a transform that is the inverse of the one used at encoder side and adding a predictor to the transformed block to obtain the decoded block. Decoding may further comprise, before the transforming step, inverse quantizing the residual block using a quantization parameter. The transform's size is equal to the size of the block to be decoded. The predictor is obtained from a plurality, i.e. at least two, of reference blocks.

At step S130, the receiver determines a frontier (one or more than one) inside the decoded block from a frontier between the plurality of reference blocks used for obtaining the predictor. Advantageously, the receiver determines frontiers inside the decoded block from the frontiers existing between the plurality of reference blocks used for obtaining the predictor.

At step S140, the receiver filters with a de-artifacting filter, e.g. a deblocking filter, along the frontier(s) determined inside the decoded block. To this aim, the deblocking filter may be the H.265 deblocking filter defined in section 8.7.2 of the document entitled "High Efficiency Video Coding" published in April 2015. It will be appreciated, however, that the present principles also apply to a deblocking filter of the H.264 type or more generally to any deblocking filter.

A deblocking filter of the H.265 type filters a frontier based on quantization parameters associated with regions apart from the frontier. Such a deblocking filter also makes use of a boundary strength parameter Bs. According to the present principles, the H.265 deblocking may be adapted to also filter a frontier within the block that is intra predicted from a plurality of reference blocks and not only the external frontiers of the block.

In a specific and non-limiting embodiment, the block is a block on which the same transform is applied, e.g. a TB, and each of the reference blocks is a block on which the same transform is applied, e.g. a TB.

Figure 15:
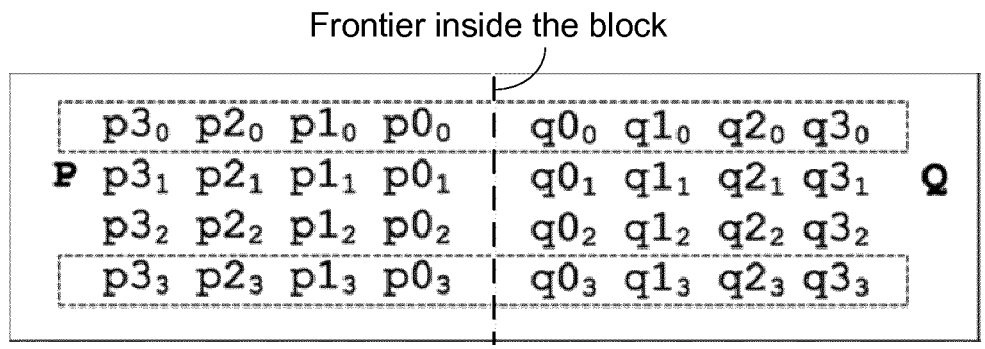
FIG. 15 depicts a frontier to be filtered inside a block.

Deblocking is thus performed on a four-sample part of a frontier as depicted in an example on FIG. 15. This figure represents a frontier inside a block that delineates two parts P and Q. $p_x$ and $q_x$ represent samples in the block. Filtering is performed on luma samples when the following criteria are true: 1) the boundary strength Bs is greater than zero; and 2) variation of signal on both sides of the frontier is below a specified threshold: $|p2,0-2p1,0+p0,0|+|p2,3-2p1,3+p0,3|+|q2,0-2q1,0+q0,0|+|q2,3 -2q1,3+q0,3|>\beta$ (1) where threshold $\beta$ depends on a quantization parameter QP and is derived from a look-up table. For frontiers with an associated Bs greater than zero, and for which (1) is true, deblocking filtering is performed. In a specific embodiment, a normal deblocking filtering is applied along the frontiers determined inside the decoded block at step S130.

Normal filtering has two modes differing in the number of pixels being modified on each side of the frontier.

If $|p2,0-2p1,0+p0,0|+|p2,3-2p1,3+p0,3|<3/16\beta$ (5), then the two nearest samples to the frontier can be modified in the left part P, otherwise only the nearest samples in P can be modified.

If $|q2,0-2q1,0+q0,0|+|q2,3-2q1,3+q0,3|<3/16\beta$ (6), then the two nearest samples to the frontier can be modified in the right part Q, otherwise only the nearest samples in Q can be modified.

Normal Filtering Operations

In the normal filtering mode for a segment of several lines, e.g. four lines, filtering operations are applied for individual lines. In the following, the second indices of pixels, indicating the line number, are omitted for brevity.

The filtered pixel values p'0 and q'0 are calculated for each line across the frontier by adding or subtracting an offset as follows:

$$p'0=p0+\Delta_0 \quad (7) \text{ and}$$

$$q'0=q0-\Delta_0 \quad (8)$$

where the value of $\Delta_0$ is obtained by clipping $\delta_0$: $\Delta_0$=clip(−tC,tC, $\delta_0$), where clip(a,b,c)=Max(a, Min(b,c)), tC is a clipping parameter dependent on the QP and $\delta 0$=(9*(q0−p0)−3*(q1−p1)+8)>>4 (9). tC is for example defined by a look-up table. Neglecting the clipping operation, the impulse response of this filter is (3 7 9−3)/16.

Furthermore, the deblocking filtering is applied to the row or column of samples across the frontier, if and only if:

$$|\delta 0|<10*tC \quad (10).$$

If (5) is true, the modified value p'1 in each line across the frontier is obtained by p'1=p1+$\Delta$p1 (11). Similarly, if (6) is true, then q'1 in each line across the frontier is obtained by q'1=q1+$\Delta$q1 (12) where the offset value $\Delta$p1=clip(−tC/2,tC/2, $\delta$p1) and $\Delta$q1=clip(−tC/2,tC/2, $\delta$q1) with $\delta$p1=(((p2+p0+1)>>1) −p1+$\Delta$0)>>1 (13) and $\delta$q1=(((q2+q0+1)>>1)−q1−$\Delta$0)>>1 (14).

Neglecting the clipping operation, the impulse response of the filter that corresponds to modification of the pixel at position p1 is (8 19−1 9−3)/32.

In a variant, whether to apply strong or normal deblocking is decided based on the first and the fourth lines across the frontier of four samples represented on FIG. 15. The following expressions using information from lines i=0 and i=3 are evaluated to make a decision between the normal and the strong filtering:

$$|p2,i-2p1,i+p0,i|+|q2,i-2q1,i+q0,i|<\beta/8 \quad (2)$$

$$|p3,i-p0,i|+|q0,i-q3,i|<\beta/8 \quad (3)$$

$$|p0,i-q0,i|<2.5*tC \quad (4)$$

If (2), (3), and (4) are true, the strong filtering is applied to the frontier. Otherwise, normal filtering is applied.

Strong Filtering Operations

The strong filter modifies more samples on each side of the frontier than the normal mode. The offset values $\Delta$0s, $\Delta$1s, and $\Delta$2s are added to pixels p0, p1, and p2, respectively, after clipping of the following $\delta$0s, $\delta$1s, and $\delta$2s values:

$$\delta 0s=(p2+2p1-6p0+2q0+q1+4)>>3 \quad (15)$$

$$\delta 1s=(p2-3p1+p0+q0+2)>>2 \quad (16)$$

$$\delta 2s=(2p3-5p2+p1+p0+q0+4)>>3. \quad (17)$$

The offset values for modification of pixels q0, q1, and q2 are calculated by exchanging q and p in (15), (16), and (17).

Impulse responses of the filters that correspond to modification of pixels p0, p1, and p2 are (1 2 2 2 1)/8, (1 1 1 1)/4, and (2 3 1 1 1)/8, respectively, if the clipping operation is neglected.

Chrome deblocking is only performed when Bs is equal to two. In this case, no further deblocking decisions are done. Only pixels p0 and q0 are modified as in (7) and (8). The deblocking is performed with the $\Delta$c value, which is obtained by clipping the following $\delta$c offset value: $\delta$c= (((q0−p0)<<2)+p1−q1 +4)>>3 (18) which corresponds to filtering by the filter with the impulse response of (1 4 4−1)/8.

According to a first specific embodiment, the deblocking filter filters the frontier inside the decoded block based on the quantization parameter QP associated with the block to be decoded. In a second specific embodiment, the deblocking filter filters the frontier inside the decoded block based on a strength parameter equal to a strength parameter used in deblocking external frontiers of the decoded block. In particular the parameters slice_beta_offset_div2 and slice_tc_offset_div2 used to compute the strength parameter may be identical in the deblocking process of internal frontiers and external frontiers.

The first and second embodiments may be combined in which case the deblocking filter filters the frontier inside the decoded block based on the quantization parameter associated with the decoded block and based on a strength parameter equal to a strength parameter used in deblocking external frontiers of the decoded block.

The method ends at step S180.

Figure 9:
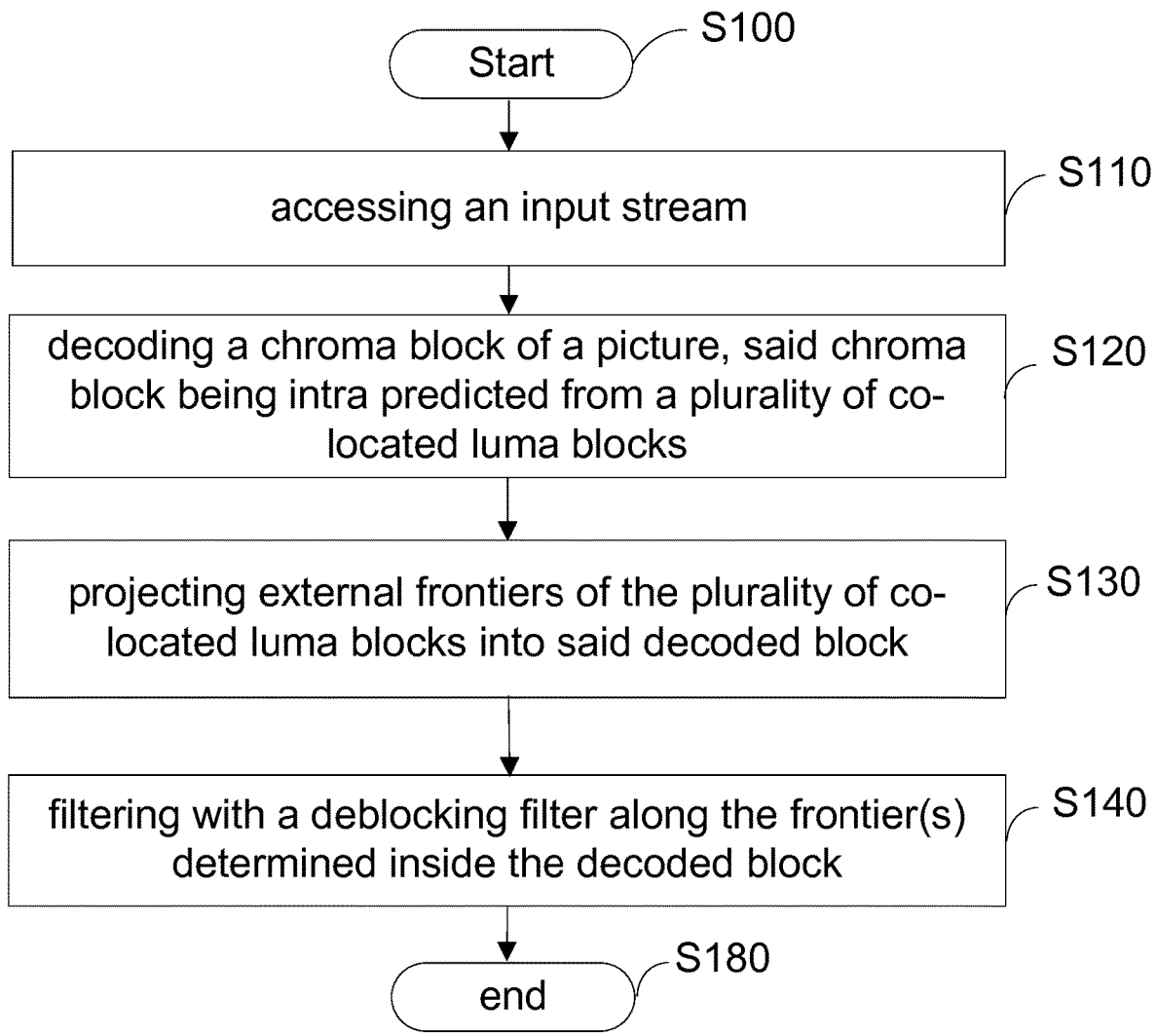
FIG. 9 represents a flowchart of a method for decoding a block of a picture from a stream to obtain a decoded block according to a specific and non-limiting embodiment, wherein the block is a chroma block predicted from a plurality of co-located luma blocks.

FIG. 9 represents a flowchart of a method for decoding a block of a picture from a stream to obtain a decoded block according to a specific and non-limiting embodiment, wherein the block is a chroma block (e.g. a chroma TB) predicted from a plurality of co-located luma blocks (the reference blocks), e.g. luma TBs.

The method starts at step S100. At step S110, a receiver accesses a stream. At step S120, the receiver decodes a chroma block from the stream. Decoding the chroma block comprises decoding a residual block from the stream, transforming the residual block using a transform inverse of the one used at encoder side and adding a predictor to the transformed block to obtain the decoded block. Decoding may further comprise, before the transformation step, inverse quantizing the residual block using a quantization parameter. The transform's size is equal to the size of the block to be decoded. The predictor is obtained by inter-component intra prediction from a plurality, i.e. at least two, of reference blocks. In this embodiment, the reference blocks are the co-located luma blocks.

At step S130, the receiver determines a frontier inside the decoded block from a frontier between the plurality of reference blocks used for obtaining the predictor. Advantageously, the receiver determines frontiers inside the decoded block from the frontiers existing between the plurality of reference blocks used for obtaining the predictor. To this aim, the receiver projects inside the chroma block the external frontiers of the luma blocks from which the chroma block is predicted as shows on FIG. 3. The projection of the frontier comprises determining inside the chroma block lines co-located with the external frontiers of the luma blocks.

In a specific and non-limiting implementation, the derivation process of transform block boundary specified in clause 8.7.2.2 of the HEVC document "*High Efficiency Video Coding*", published in April 2015, is adapted to derive frontiers inside the chroma block. More precisely, the 2-dimensional array edgeFlags generated by the derivation process of section 8.7.2.2 which identifies the transform block boundaries inside a luma coding block, is used to derive the frontiers inside the decoded chroma block. To do so, a secondary array edgeFlag_chroma is computed, through the sub-sampling of the luma related array edgeFlags. This sub-sampling takes into account the chroma resolution relative to the luma component resolution. In the 4:4:4 chroma format case, it simply consists in copying the luma related edgeFlags array.

In another embodiment, the boundary strength Bs determined for the luma component is propagated towards the chroma components, through a sub-sampling process from the luma component resolution to the chroma component resolution. This way the decoder obtains the boundary strength associated with each frontier derived inside the chroma block.

At step S140, the receiver thus filters along the projected frontier(s) inside the decoded block with a deblocking filter. To this aim, the deblocking filter may be the H.265 deblocking filter defined in section 8.7.2 of the document entitled "High Efficiency Video Coding" published in April 2015. It will be appreciated, however, that the present principles are not restricted to this specific deblocking filter process. The variants disclosed with respect to FIG. 8 applies.

According to a specific embodiment, the deblocking filter filters the frontier inside the decoded block based on a quantization parameter QP associated with the plurality of co-located luma blocks instead of the QP associated with the block to be decoded.

The method ends at step S180.

The method described with respect to FIG. 9 may be repeated to encode each chroma TB in a CB.

Figure 10:
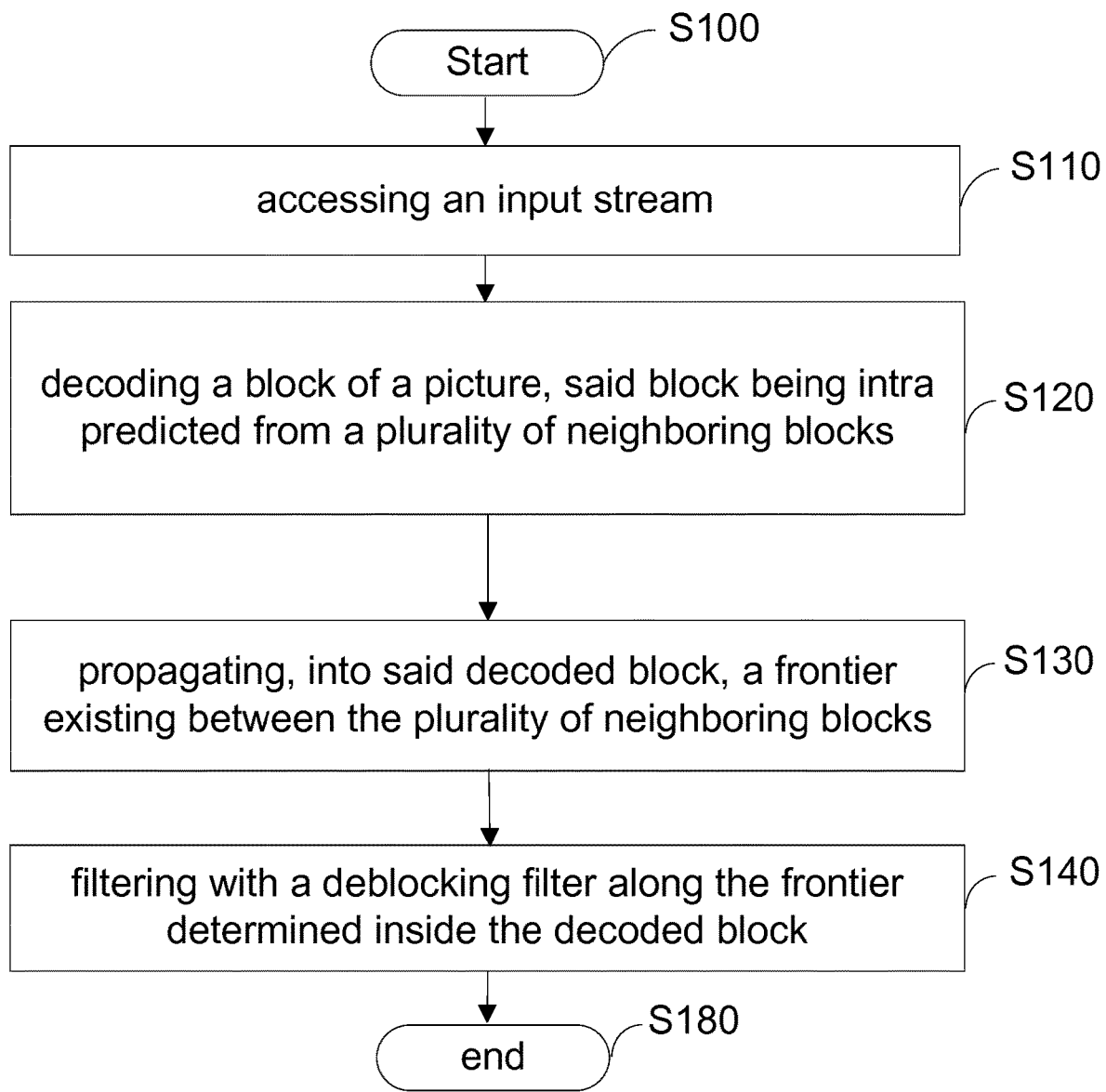
FIG. 10 represents a flowchart of a method for decoding a block of a picture from a stream to obtain a decoded block according to a specific and non-limiting embodiment, wherein the block is a chroma or a luma block predicted from a plurality of spatially neighboring blocks.

FIG. 10 represents a flowchart of a method for decoding a block of a picture from a stream to obtain a decoded block according to a specific and non-limiting embodiment, wherein the block is a chroma or a luma block (e.g. a luma or a chroma TB) predicted from a plurality of spatially neighboring blocks (the reference block), e.g. spatially neighboring TBs.

Figure 1:
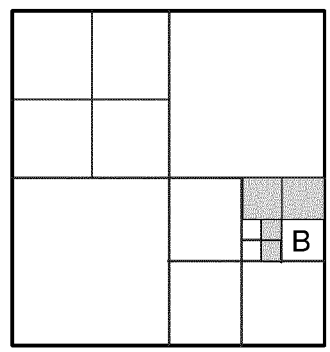
FIG. 1 depicts a current block B intra predicted from a plurality of reference blocks.

The method starts at step S100. At step S110, a receiver accesses a stream. At step S120, the receiver decodes a block (i.e. a luma or a chroma block) from the stream. Decoding the block comprises decoding a residual block from the stream, transforming the residual block using a transform of the one used at encoder side and adding a predictor to the transformed block to obtain the decoded block. Decoding may further comprise inverse quantizing the residual block using a quantization parameter before transforming it. The transform's size is equal to the size of the block to be decoded. The predictor is obtained by spatial intra prediction from a plurality, i.e. at least two, of reference blocks. In this embodiment, the reference blocks are the spatially neighboring blocks of the block to be decoded as shown on FIG. 1.

At step S130, the receiver determines a frontier inside the decoded block from a frontier between the plurality of reference blocks used for obtaining the predictor. To this aim, the receiver propagates a frontier inside the decoded block in the direction of prediction as depicted on FIGS. 5 and 6, wherein the frontier that is propagated is a frontier between two spatially neighboring decoded blocks. Advantageously, the receiver propagates frontiers inside the decoded block in the direction of prediction from the frontiers existing between the plurality of reference blocks used for obtaining the predictor.

The propagation of the frontier between two reference blocks used for the spatial intra prediction of a given block is done as follows. The input to the process are the following ones.

A two-dimensional w×h array of Boolean values that are all initialized to false, where w and h are respectively the width and height of the predicted block. The array is noted propagated_frontier[0 . . . (w−1)][0 . . . (h−1)].

a set of the neighbouring samples p[x][y], with x=−1, y=−1 . . . h*2−1 and x=0 . . . w*2−1, y=−1, where all samples are set equal to 0, except the sample at position corresponding to the frontier between two reference blocks used for the spatial prediction of current block.

the intra prediction mode associated to current block predModeIntra.

The output is the modified array propagated_frontier, where each sample equal to TRUE identifies a pixel position where the propagated frontier is located, and a sample equal to FALSE identifies a pixel position where no propagated frontier is located.

The computation of the output propagated_frontier array is as follows.

For each position (x,y) in current block (x=0, . . . w−1; y=0, . . . , h−1)

perform the intra prediction of current block's sample at position (x,y), according to the intra prediction process specified in the "High Efficiency Video Coding" specification published in April 2015, subclause 8.4.4.2.4 (for planar prediction) or 8.4.4.2.6 (for angular prediction).

If the predicted sample at position (x,y) has a value greater than a given threshold, then the sample (x,y) is marked as belonging to the propagated frontier. This means noted propagated_frontier[x][y] is set equal to TRUE. Otherwise, the sample (x,y) is marked as not belonging to the propagated frontier. This means noted propagated_frontier[x][y] is set equal to FALSE.

At step S140, the receiver thus filters along the propagated frontier(s) inside the decoded block with a deblocking filter. To this aim, the deblocking filter may be the H.265 deblocking filter defined in section 8.7.2 of the document entitled "High Efficiency Video Coding" published in April 2015. It will be appreciated, however, that the present principles are not restricted to this specific deblocking filter process. The variants disclosed with respect to FIG. 8 applies.

The method ends at step S180.

The method described with respect to FIG. 10 may be repeated to encode each chroma TB in a CB.

Figure 11:
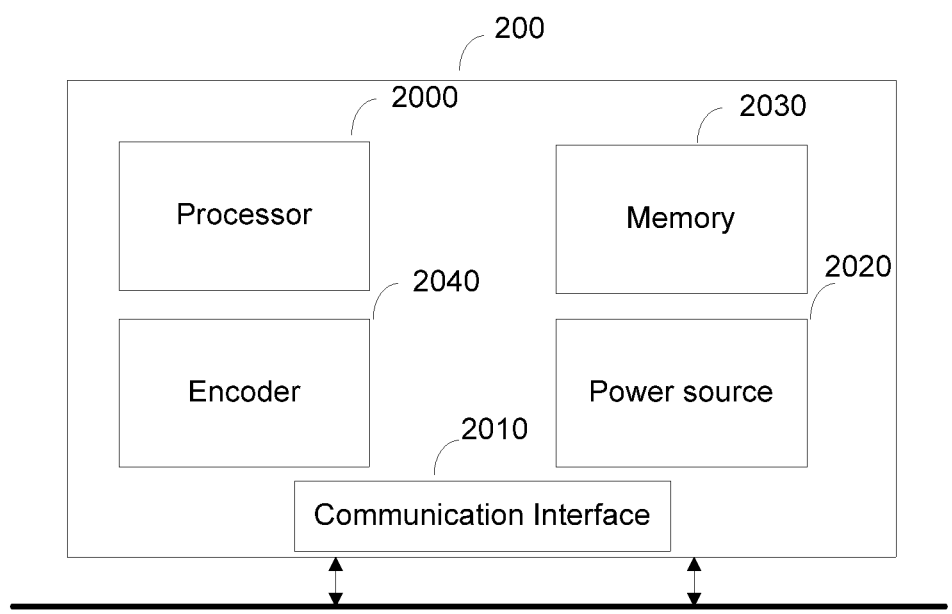
FIG. 11 represents an exemplary architecture of a transmitter configured to encode a block of a picture in a stream according to a specific and a non-limiting embodiment, wherein the block is intra predicted.

FIG. 11 represents an exemplary architecture of a transmitter 100 configured to encode a block of a picture in a stream according to a specific and a non-limiting embodiment, wherein the block is intra predicted.

The transmitter 200 comprises one or more processor(s) 2000, which could comprise, for example, a CPU, a GPU and/or a DSP (English acronym of Digital Signal Processor), along with internal memory 2030 (e.g. RAM, ROM, and/or EPROM). The transmitter 200 comprises one or more communication interface(s) 2010 (e.g. a keyboard, a mouse, a touchpad, a webcam), each adapted to display output information and/or allow a user to enter commands and/or data; and a power source 2020 which may be external to the transmitter 200. The transmitter 200 may also comprise one or more network interface(s) (not shown). Encoder module 2040 represents the module that may be included in a device to perform the coding functions. Additionally, encoder module 2040 may be implemented as a separate element of the transmitter 200 or may be incorporated within processor(s) 2000 as a combination of hardware and software as known to those skilled in the art.

The block may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the stream may be sent to a destination. As an example, the stream is stored in a remote or in a local memory, e.g. a video memory or a RAM, a hard disk. In a variant, the stream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 200 further comprises a computer program stored in the memory 2030. The computer program comprises instructions which, when executed by the transmitter 200, in particular by the processor 2000, enable the transmitter 200 to execute the encoding method described with reference to any one of the FIG. 12, 13 or 14. According to a variant, the computer program is stored externally to the transmitter 200 on a non-transitory digital data support, e.g. on an external storage medium such as a HDD, CD-ROM, DVD, a read-only and/or DVD drive and/or a DVD Read/Write drive, all known in the art. The transmitter 200 thus comprises a mechanism to read the computer program. Further, the transmitter 200 could access one or more Universal Serial Bus (USB)-type storage devices (e.g., "memory sticks.") through corresponding USB ports (not shown).

According to exemplary and non-limiting embodiments, the transmitter 200 can be, but is not limited to:
- a mobile device;
- a communication device;
- a game device;
- a tablet (or tablet computer);
- a laptop;
- a still image camera;
- a video camera;
- an encoding chip or encoding device;
- a still image server; and
- a video server (e.g. a broadcast server, a video-on-demand server or a web server).

Figure 12:
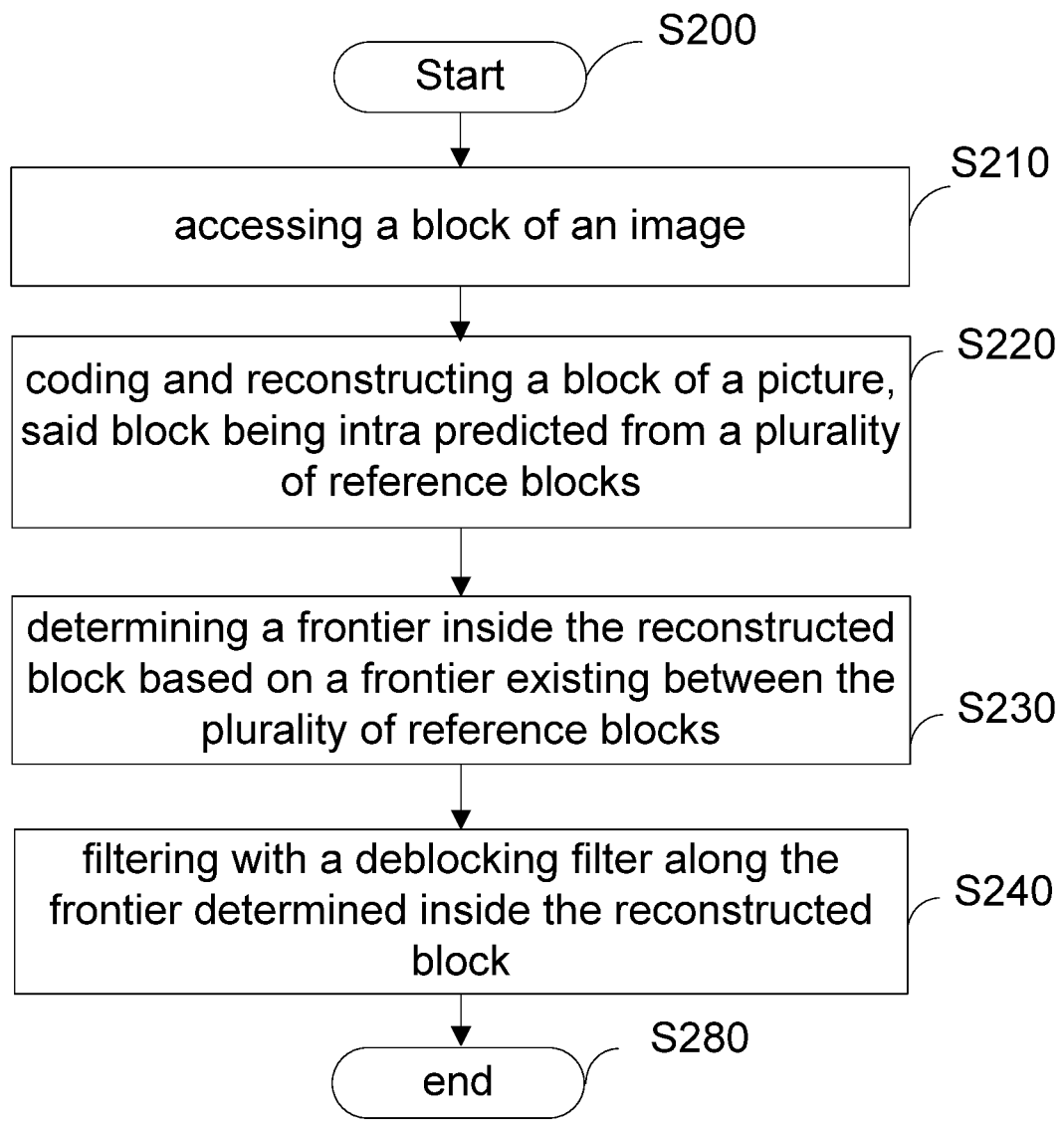
FIG. 12 represents a flowchart of a method for encoding a block in a stream according to a specific and non-limiting embodiment, wherein the block is intra predicted.

FIG. 12 represents a flowchart of a method for encoding a block in a stream according to a specific and non-limiting embodiment, wherein the block is intra predicted from a plurality, i.e. at least two, of reference blocks.

The method starts at step S200. At step S210, a transmitter accesses a block of a picture. At step S220, the transmitter codes and reconstructs the accessed block. Coding the accessed block, called the block in the following, comprises obtaining a residual block by subtracting a predictor from the block, transforming the residual block using a transform (inverse of the one used at decoder side) and encoding the transformed block into the stream. Coding may further comprise quantizing the transformed block using a quantization parameter. Reconstructing the accessed block after coding comprises transforming the residual block using a transform that is the inverse of the one used for encoding and adding the predictor to the transformed block to obtain the reconstructed block. Reconstructing may further comprise, before the transforming step, inverse quantizing the residual block using a quantization parameter.

The transform's size is equal to the size of the block to be coded. The predictor is obtained from a plurality, i.e. at least two, of reference blocks.

At step S230, the transmitter determines a frontier (one or more than one) inside the reconstructed block from a frontier between the plurality of reference blocks used for obtaining the predictor. This step is identical to the step S130 of the decoding method of FIG. 8. All the variants disclosed with respect to step S130 also apply to step S230.

At step S240, the transmitter filters along the frontiers determined inside the reconstructed block with a deblocking filter. This step is identical to the step S140 of the decoding method. All the variants disclosed with respect to step S140 also apply to step S240.

The method ends at step S280.

In a specific and non-limiting embodiment, the block is a block on which the same transform is applied, e.g. a TB, and each of the reference blocks is a block on which the same transform is applied, e.g. a TB.

Figure 13:
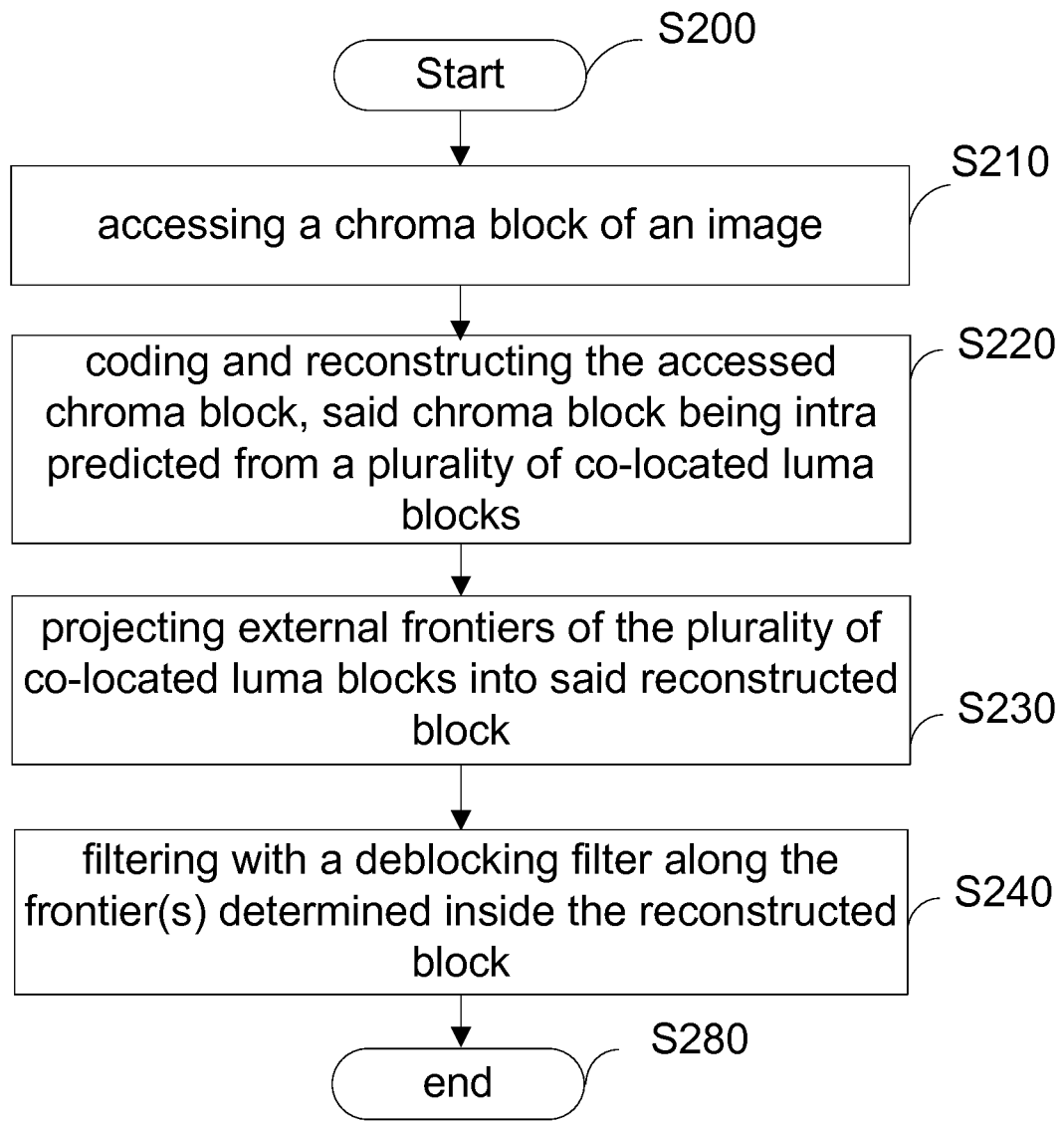
FIG. 13 represents a flowchart of a method for coding a block of a picture in a stream according to a specific and non-limiting embodiment, wherein the block is a chroma block predicted from a plurality of co-located luma blocks.

FIG. 13 represents a flowchart of a method for coding a block of a picture in a stream according to a specific and non-limiting embodiment, wherein the block is a chroma block (e.g. a chroma TB) predicted from a plurality co-located luma blocks, e.g. a plurality of luma TBs.

The method starts at step S200. At step S210, a transmitter accesses a block of an image. At step S220, the transmitter codes and reconstructs the accessed block. Coding the accessed block, called the block in the following, comprises obtaining a residual block by subtracting a predictor from the block, transforming the residual block using a transform (inverse of the one used at decoder side) and encoding the transformed block into the stream. Coding may further comprise quantizing the transformed block using a quantization parameter.

The transform's size is equal to the size of the block to be coded. The predictor is obtained by inter-component prediction from a plurality, i.e. at least two, of reference blocks. In this embodiment, the reference blocks are the luma blocks co-located with the chroma block.

At step S230, the transmitter determines a frontier inside the reconstructed block from a frontier between the plurality of reference blocks used for obtaining the predictor. To this aim, the receiver projects inside the chroma block the external frontiers of the luma blocks from which the chroma block is predicted as shows on FIG. 3. The projection of the frontier comprises determining inside the chroma block lines co-located with the external frontiers of the luma blocks. This step is identical to the step S130 of FIG. 9 and is not further disclosed.

At step S240, the transmitter filters along the frontiers projected inside the reconstructed block with a deblocking filter. This step is identical to the step S140 of the decoding method. All the variants disclosed with respect to step S140 also apply to step S240 and are not further disclosed.

The method ends at step S280.

The method described with respect to FIG. 13 may be repeated to encode each TB (luma or chroma) of a CB.

Figure 14:
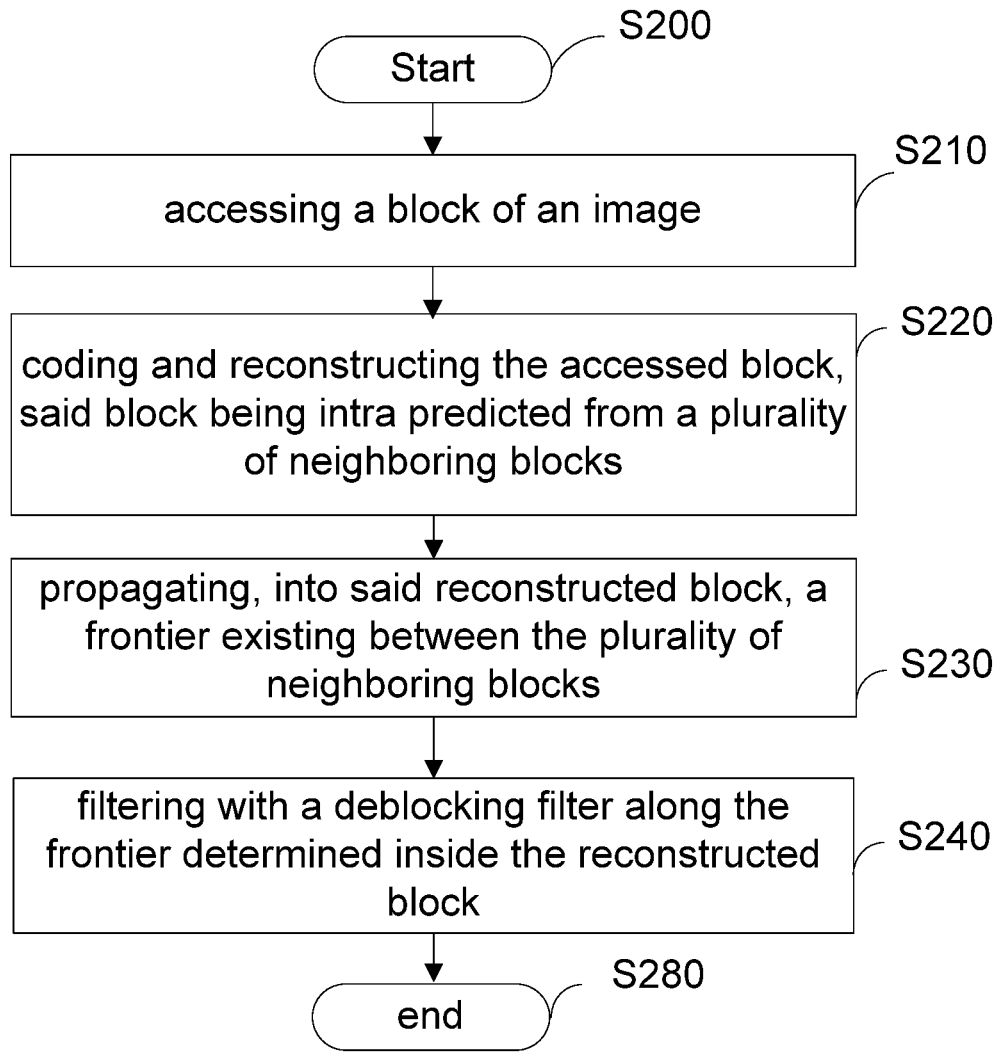
FIG. 14 represents a flowchart of a method for coding a block of a picture in a stream according to a specific and non-limiting embodiment, wherein the block is a chroma or a luma block predicted from a plurality of spatially neighboring blocks.

FIG. 14 represents a flowchart of a method for coding a block of a picture in a stream according to a specific and non-limiting embodiment, wherein the block is a chroma or a luma block (e.g. luma or chroma TB) predicted from a plurality of spatially neighboring blocks, e.g. from a plurality of spatially neighboring TBs.

The method starts at step S200. At step S210, a transmitter accesses a block of a picture. At step S220, the transmitter codes and reconstructs the accessed block. Coding the accessed block, called the block in the following, comprises obtaining a residual block by subtracting a predictor from the block, transforming the residual block using a transform (that is the inverse of the one used at decoder side) and encoding the transformed block into the stream.

The transform's size is equal to the size of the block to be coded. The predictor is obtained by spatial intra prediction from a plurality, i.e. at least two, of reference blocks. In this embodiment, the reference blocks are the spatially neighboring blocks. Coding may further comprise quantizing the transformed block using a quantization parameter.

At step S230, the transmitter determines a frontier inside the reconstructed block from a frontier between the plurality of reference blocks used for obtaining the predictor. To this aim, the transmitter propagates a frontier inside the reconstructed block in the direction of prediction as depicts on FIGS. 5 and 6, wherein the frontier that is propagated is a frontier between two spatially neighboring reconstructed blocks. This step is identical to the step S130 of FIG. 10 and is not further disclosed.

At step S240, the transmitter filters along the frontiers propagated inside the reconstructed block with a deblocking filter. This step is identical to the step S140 of the decoding method. All the variants disclosed with respect to step S140 also apply to step S240 and are not further disclosed.

The method ends at step S280.

The method described with respect to FIG. 14 may be repeated to encode each TB (luma or chroma) of a CB.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A decoding method comprising:
   decoding a chroma block of a picture, said chroma block being intra predicted according to an intra linear prediction mode from a reconstructed co-located luma block reconstructed from at least two luma blocks;
   determining a frontier inside the decoded chroma block by projecting lines of the reconstructed co-located luma block, said lines being co-located with the external frontiers of the at least two luma blocks; and filtering along the frontier determined inside the decoded chroma block.

2. The decoding method of claim 1, wherein said reconstructed co-located luma block being a luma block predicted from a plurality of spatially neighboring luma blocks according to an angular direction of prediction, and wherein determining a frontier inside the decoded chroma block comprises propagating, into said decoded chroma block, a frontier existing between said plurality of spatially neighboring luma blocks, wherein said frontier is propagated in the angular direction of prediction.

3. The decoding method according to claim 1, wherein said filter filters the frontier inside the decoded chroma block based on a quantization parameter associated with said plurality of co-located luma blocks.

4. The decoding method according to claim 1, wherein said filter filters the frontier inside the decoded chroma block based on a quantization parameter associated with said block to be decoded.

5. The decoding method according to claim 1, wherein said filter filters the frontier inside the decoded chroma block based on a strength parameter equal to a strength parameter used in de-artifacting external frontiers of said decoded chroma block.

6. A coding method comprising:
coding and reconstructing a chroma block of a picture, said chroma block being intra predicted according to an intra linear prediction mode from a reconstructed co-located luma block reconstructed from at least two luma blocks;
determining a frontier inside the reconstructed chroma block by projecting lines of the reconstructed co-located luma block, said lines being co-located with the external frontiers of the at least two luma blocks; and
filtering along the frontier determined inside the reconstructed chroma block.

7. The coding method of claim 6, wherein said reconstructed co-located luma block being a luma block predicted from a plurality of spatially neighboring luma blocks according to an angular direction of prediction, and wherein determining a frontier inside the reconstructed chroma block comprises propagating, into said reconstructed chroma block, a frontier existing between said plurality of spatially neighboring luma blocks, wherein said frontier is propagated in the angular direction of prediction.

8. The coding method according to claim 6, wherein said filter filters the frontier inside the reconstructed block based on a quantization parameter associated with said plurality of co-located luma blocks.

9. The coding method according to claim 6, wherein said filter filters the frontier inside the reconstructed block based on a quantization parameter associated with said block to be coded.

10. The coding method according to claim 6, wherein said filter filters the frontier inside the reconstructed block based on a strength parameter equal to a strength parameter used in de-artifacting external frontiers of said reconstructed block.

11. A decoding device comprising one or more processors configured to perform:
decoding a chroma block of a picture, said chroma block being intra predicted according to an intra linear prediction mode from a reconstructed co-located luma block reconstructed from at least two luma blocks;
determining a frontier inside the decoded chroma block by projecting lines of the reconstructed co-located luma block, said lines being co-located with the external frontiers of the at least two luma blocks; and
filtering along the frontier determined inside the decoded chroma block.

12. The decoding device of claim 11, wherein said reconstructed co-located luma block being a luma block predicted from a plurality of spatially neighboring luma blocks according to an angular direction of prediction, and wherein determining a frontier inside the decoded chroma block comprises propagating, into said decoded chroma block, a frontier existing between said plurality of spatially neighboring luma blocks, wherein said frontier is propagated in the angular direction of prediction.

13. The decoding device according to claim 11, wherein said filter filters the frontier inside the decoded chroma block based on a quantization parameter associated with said plurality of co-located luma blocks.

14. The decoding device according to claim 11, wherein said filter filters the frontier inside the decoded chroma block based on a quantization parameter associated with said block to be decoded.

15. The decoding device according to claim 11, wherein said filter filters the frontier inside the decoded chroma block based on a strength parameter equal to a strength parameter used in de-artifacting external frontiers of said decoded chroma block.

16. A coding device comprising one or more processors configured to perform:
coding and reconstructing a chroma block of a picture, said chroma block being intra predicted according to an intra linear prediction mode from a reconstructed co-located luma block reconstructed from at least two luma blocks;
determining a frontier inside the reconstructed chroma block by projecting lines of the reconstructed co-located luma block, said lines being co-located with the external frontiers of the at least two luma blocks; and
filtering with a filter along the frontier determined inside the reconstructed block.

17. The coding device of claim 16, wherein said reconstructed co-located luma block being a luma block predicted from a plurality of spatially neighboring luma blocks according to an angular direction of prediction, determining a frontier inside the reconstructed chroma block comprises propagating, into said reconstructed chroma block, a frontier existing between said plurality of spatially neighboring luma blocks, wherein said frontier is propagated in the angular direction of prediction.

18. The coding device according to claim 16, wherein said filter filters the frontier inside the reconstructed chroma block based on a quantization parameter associated with said plurality of co-located luma blocks.

19. The coding device according to claim 16, wherein said filter filters the frontier inside the reconstructed chroma block based on a quantization parameter associated with said block to be coded.

20. The coding device according to claim 16, wherein said filter filters the frontier inside the reconstructed chroma block based on a strength parameter equal to a strength parameter used in de-artifacting external frontiers of said reconstructed chroma block.

* * * * *